J. H. COX.
OYSTER SHIPPING BUCKET.
APPLICATION FILED JUNE 21, 1907

900,986.

Patented Oct. 13, 1908.

WITNESSES:
Lionel Scrimger
Raymond H. Whiting.

John Henry Cox
INVENTOR
BY William W. Varney
HIS ATTORNEY.

UNITED STATES PATENT OFFICE.

JOHN HENRY COX, OF FAIRMOUNT, MARYLAND.

OYSTER-SHIPPING BUCKET.

No. 900,986.

Specification of Letters Patent.

Patented Oct. 13, 1908.

Application filed June 21, 1907. Serial No. 380,077.

*To all whom it may concern:*

Be it known that I, JOHN HENRY COX, a citizen of the United States, residing at Fairmount, in the county of Somerset and State of Maryland, have invented a new and useful Oyster-Shipping Bucket, of which the following is a specification.

My invention relates to improvements in oyster shipping buckets of the refrigerating type; and the objects of my improvement are, first, an oyster shipping bucket in which the ice is kept separate from the oysters; second, the cooling of the bottom of the contents of the bucket; third, the sealing of the refrigerating material or ice to keep the air away from the same; fourth, improved means of introducing the ice in the interior of the contents of the bucket and holding the same there; fifth, means of closing and protecting the contents of the oyster bucket when the same has to be recharged; and, sixth, the closing of the receptacle containing the oysters and refrigerating material. I attain these objects by the mechanism illustrated in the accompanying drawing, in which—

Figure 1:
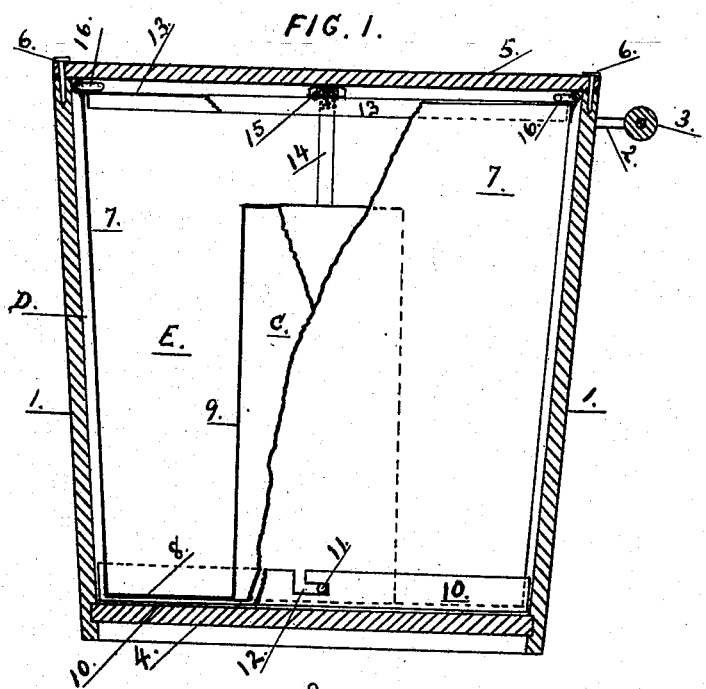
Figure 2:
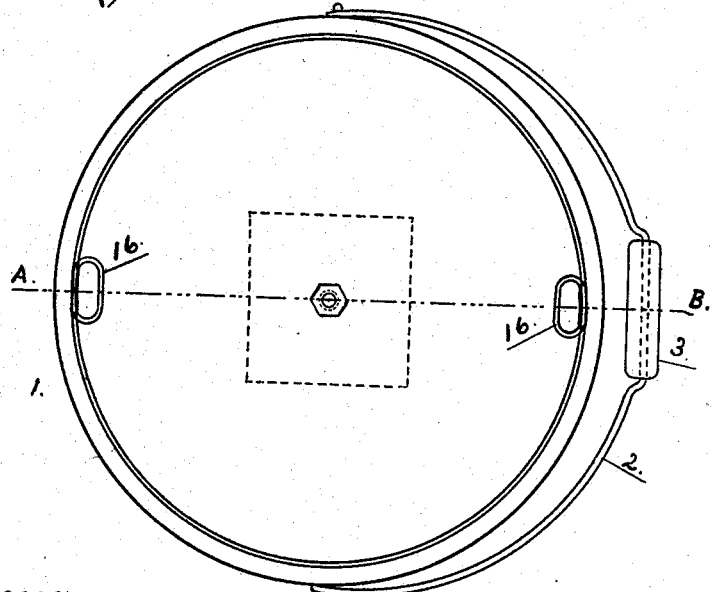

Figure 1 shows a sectional view taken on the line "A B" of the containing bucket; the interior oyster can being also shown in section in part; also the various covers are shown in section in part; Fig. 2, is a plan view of my improved oyster shipping bucket.

Similar numerals refer to similar parts throughout the several views.

1 is the containing bucket, and is usually made of wood and having a bail 2 on which is handle 3. Containing bucket 1 has a bottom in it 4 made in the usual way, and has a lid or cover 5 which may be nailed on with nails 6, or secured in some other way. Inside of containing bucket 1, is oyster can 7 inside of which is space E having bottom 8 and internal compartment 9. The space C of the internal compartment 9 is open to the outside of oyster can 7 and into space D which space is between the interior walls of the containing bucket 1 and the exterior of the oyster can 7 and is not open to the interior of said oyster can 7 excepting through top of said can. The bottom of oyster can 7 has a cover 10 which incloses the space of the internal compartment C; said cover 10 is held in place by fasteners 11 secured on to oyster can 7 and on which cover 10 fits at 12; oyster can 7 has a lid or cover 13 which fits the top of said bucket tightly, and is secured in place by locking rod 14 which goes through said cover 13 and has a nut or fastening 15 outside of said cover securing said cover to said oyster can; also said cover may have similar locking devices as bottom cover 10, as are shown at 11 and 12, for the sake of clearness they have been omitted from the drawing. Oyster can 7 has lifting handles 16 secured to it by means of ears soldered on to the outside so as not to interfere with cover 13 and so formed that said lifting handles 16 may fold down over cover 13 when the same is in place as shown in Fig. 1 and a cord or sealing device may be run through said two handles 16 with a seal attached to show that the bucket has not been tampered with. Locking rod 14 is secured on the end of internal compartment 9 and is threaded on its upper end to receive locking nut 15.

The operation of my invention is as follows:—A block of ice as near the shape and size of internal compartment C as possible is put into the same, cover 10 is then put into position and secured there by giving it a partial rotation, thus bringing fasteners 11 and 12 into operation. The cover fits loosely thereby allowing the water from the melted ice to run out; oyster can 7 is now put into containing bucket 1, space D being filled to the top of internal compartment 9 or a little above, with oysters to be shipped; lid 13 is then put on and secured to oyster can 7 and if desired the seal cord is run through lifting handles 16 and a seal put on;
cover 5 is then secured to containing bucket 1. The water from the melted ice in the internal compartment C finds its level in space D thus sealing internal compartment C from the air. When renewal of ice is desirable, oyster can 7 by means of lifting handles 16 may be removed from the containing bucket, cover 10 removed, a new piece of ice put into the internal compartment C, cover 10 restored, superfluous water poured out of containing bucket 1, and the oyster can 7 again put into the said containing bucket 1 and the cover put on.

Having thus described my invention; what I claim, and desire to secure by Letters Patent, is,—

1. A shipping case consisting of a containing bucket, a cover to said containing bucket, an oyster can contained in said containing bucket, a cover to said oyster can, means of securing said cover to said oyster can, an internal compartment in said oyster can having an opening in the bottom thereof, a covering for the said opening in said internal compartment in said oyster can covering loosely the same, and means of securing said covering in place to said oyster can, substantially as described.

2. An oyster shipping case consisting of a containing bucket, an oyster can contained in said containing bucket having an internal compartment, means of introducing a refrigerating substance in the said internal compartment from the bottom consisting of an opening into said compartment, means of retaining said refrigerating substance in said internal compartment consisting of a cover for the opening into said internal compartment, and means of communicating between said internal compartment and said containing bucket consisting of the opening in the said compartment at the bottom of said oyster can and the space between the loosely fitting cover and the said oyster can.

3. An oyster shipping case consisting of a containing bucket, an oyster can contained in said containing bucket, an internal compartment in said oyster can, means for introducing a refrigerating substance in the said internal compartment from the bottom consisting of an opening into said compartment, means for retaining said refrigerating substance in said internal compartment consisting of a cover for the opening into said internal compartment, and means for securing said cover consisting of fastenings on the periphery thereof whereby the same fits loosely.

JOHN HENRY COX.

Witnesses:
HERSCHEL FORD,
LAMBERT W. COX.